(12) United States Patent
Baumgarten et al.

(10) Patent No.: US 7,600,535 B2
(45) Date of Patent: Oct. 13, 2009

(54) VALVE UNIT FOR PRESSURE EXCHANGER INSTALLATIONS

(75) Inventors: Sven Baumgarten, Freinsheim (DE);
Stephan Bross, Erpolzheim (DE);
Bernhard Brecht, Neustadt/Weinstrasse (DE); Uwe Bruhns, Osthofen (DE);
Stefan Flak, Frankenthal (DE);
Christoph Jaeger, Gerolsheim (DE);
Wolfgang Kochanowski, Windesheim (DE); Wiltrud Knoebl, Ludwigshafen (DE); Mogens Ellegaard, Greve (DK)

(73) Assignee: KSB Aktiengesellschaft, Frankenthal (DE)

( * ) Notice: Subject to any disclaimer, the term of this patent is extended or adjusted under 35 U.S.C. 154(b) by 277 days.

(21) Appl. No.: 11/222,866

(22) Filed: Sep. 12, 2005

(65) Prior Publication Data
US 2006/0054223 A1      Mar. 16, 2006

Related U.S. Application Data

(63) Continuation of application No. PCT/EP2004/001532, filed on Feb. 18, 2004.

(30) Foreign Application Priority Data

Mar. 12, 2003   (DE)   ................................. 103 10 663
Jan. 17, 2004   (DE)   ....................... 10 2004 002 547

(51) Int. Cl.
*F16K 11/083*    (2006.01)
*B01D 61/02*    (2006.01)
*B01D 61/06*    (2006.01)

(52) U.S. Cl. ........................... 137/625.43; 137/625.46; 210/137; 210/321.66; 210/424

(58) Field of Classification Search ............. 137/625.23, 137/311, 625.43, 625.46; 210/137, 424, 210/321.66
See application file for complete search history.

(56) References Cited

U.S. PATENT DOCUMENTS 630,124 A * 8/1899 Stage .................... 137/625.23

(Continued)

FOREIGN PATENT DOCUMENTS

CH           429 344         1/1967

(Continued)

OTHER PUBLICATIONS

International Search Report dated May 18, 2004, corresponding to International Application No. PCT/EP2004/001532.

(Continued)

*Primary Examiner*—John Rivell
(74) *Attorney, Agent, or Firm*—Crowell & Moring LLP

(57) ABSTRACT

A valve for switching over liquid paths, particularly for pressure exchanger installations with tubular pressure exchanger chambers (3) through which an alternating flow occurs, in which a rotatable control element (10, 10.1) having a plurality of flow paths is mounted in a housing (11), which in turn comprises a plurality of connection opening (12, 16, 17, 46) connected to a first pipe system and to an end of at least one pressure exchanger. Another end of the pressure exchanger is connected to a second pipe system through a valve. A motorized drive shaft (50) rotates the control element so as to alternately connect the control element flow paths to openings inside housing (11). Oncoming flow to the control element may come from an axial direction or from a radial direction, and outgoing flow from the control element occurs in the axial direction.

48 Claims, 8 Drawing Sheets

U.S. PATENT DOCUMENTS

| | | | | |
|---|---|---|---|---|
| 1,630,781 | A * | 5/1927 | Burman | 137/625.23 |
| 2,012,427 | A * | 8/1935 | Haun | 137/246.18 |
| 2,749,941 | A * | 6/1956 | Gardner | 137/625.23 |
| 3,022,738 | A * | 2/1962 | Krute | 137/625.23 |
| 3,369,667 | A | 2/1968 | Clark et al. | |
| 3,431,747 | A * | 3/1969 | Hashemi et al. | 417/339 |
| 3,558,242 | A | 1/1971 | Jenkyn-Thomas | |
| 3,734,461 | A * | 5/1973 | Burger | 251/366 |
| 3,791,768 | A | 2/1974 | Wanner | |
| 4,124,488 | A | 11/1978 | Wilson | |
| 4,187,173 | A | 2/1980 | Keefer | |
| 4,367,140 | A | 1/1983 | Wilson | |
| 4,434,056 | A | 2/1984 | Keefer | |
| 4,632,754 | A | 12/1986 | Wood | |
| 4,637,783 | A * | 1/1987 | Andeen | 417/318 |
| 4,705,625 | A | 11/1987 | Hart, Jr. | |
| RE33,135 | E | 12/1989 | Wanner et al. | |
| 4,973,408 | A | 11/1990 | Keefer | |
| 4,983,305 | A | 1/1991 | Oklejas et al. | |
| 5,102,543 | A | 4/1992 | Burroughs | |
| 5,306,428 | A * | 4/1994 | Tonner | 210/652 |
| 5,797,429 | A * | 8/1998 | Shumway | 137/625.69 |
| 6,017,200 | A * | 1/2000 | Childs et al. | 417/404 |
| 7,152,620 | B2 * | 12/2006 | Baumgarten et al. | 137/311 |
| 7,168,927 | B2 * | 1/2007 | Brueckmann et al. | 417/392 |

FOREIGN PATENT DOCUMENTS

| | | |
|---|---|---|
| DE | 691 16 670 T2 | 9/1996 |
| DE | 299 16 786 U1 | 2/2001 |
| EP | 1 095 693 A1 | 5/2001 |
| GB | 915827 | 1/1963 |
| GB | 2 204 664 A | 11/1988 |

OTHER PUBLICATIONS

German Search Report based on German Application No. 103 10 663.4.

* cited by examiner

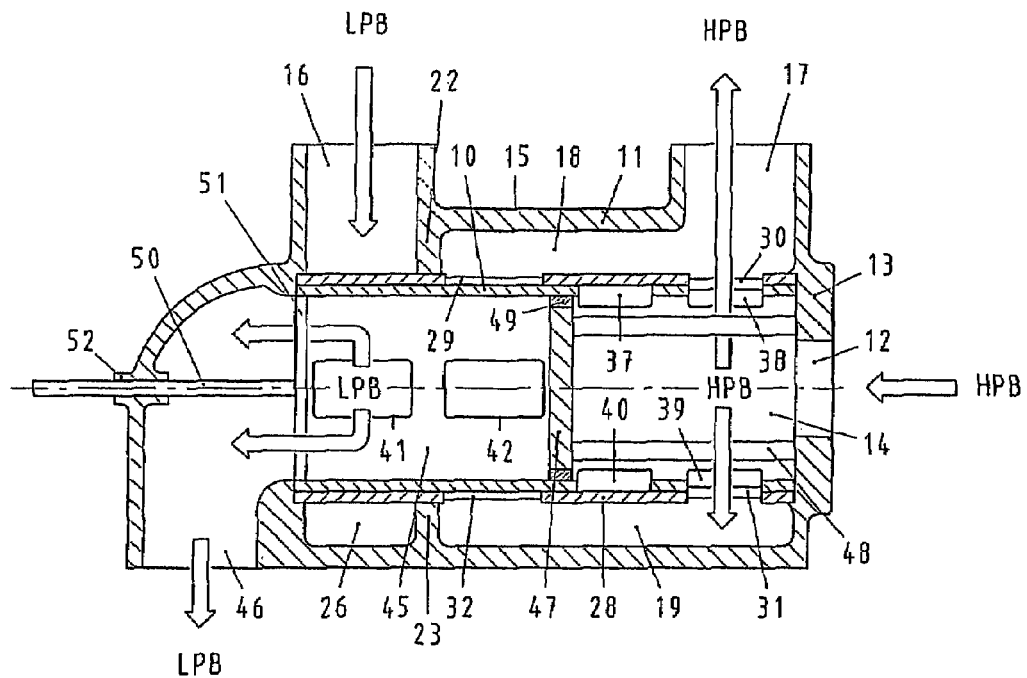
Fig. 3a (A – A)
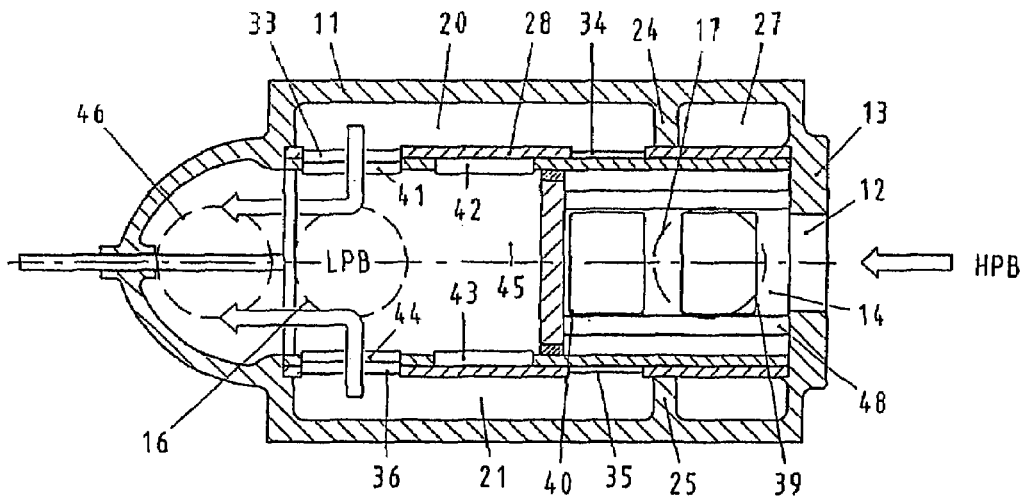
Fig. 3b (B – B)

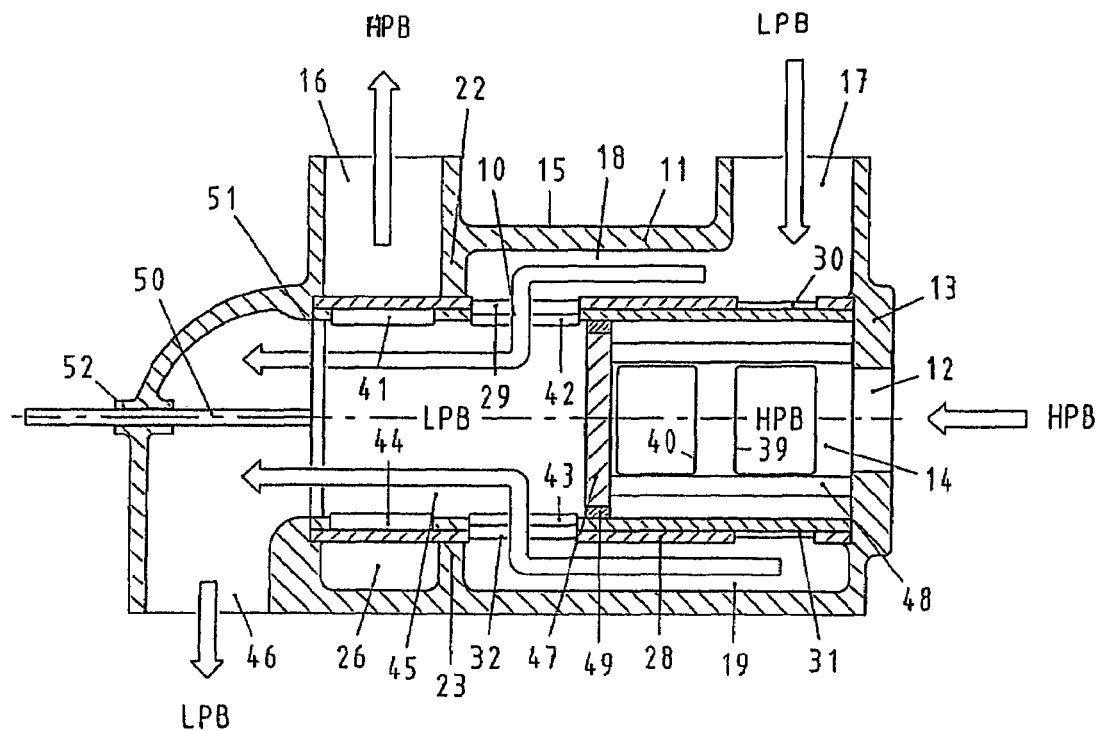
Fig. 4a (A – A)
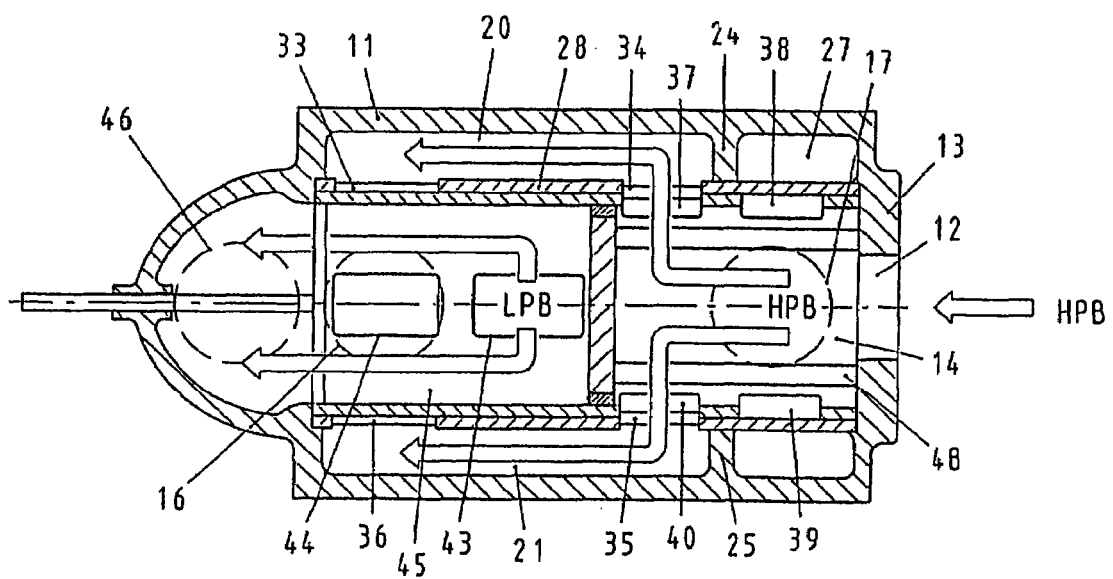
Fig. 4b (B – B)

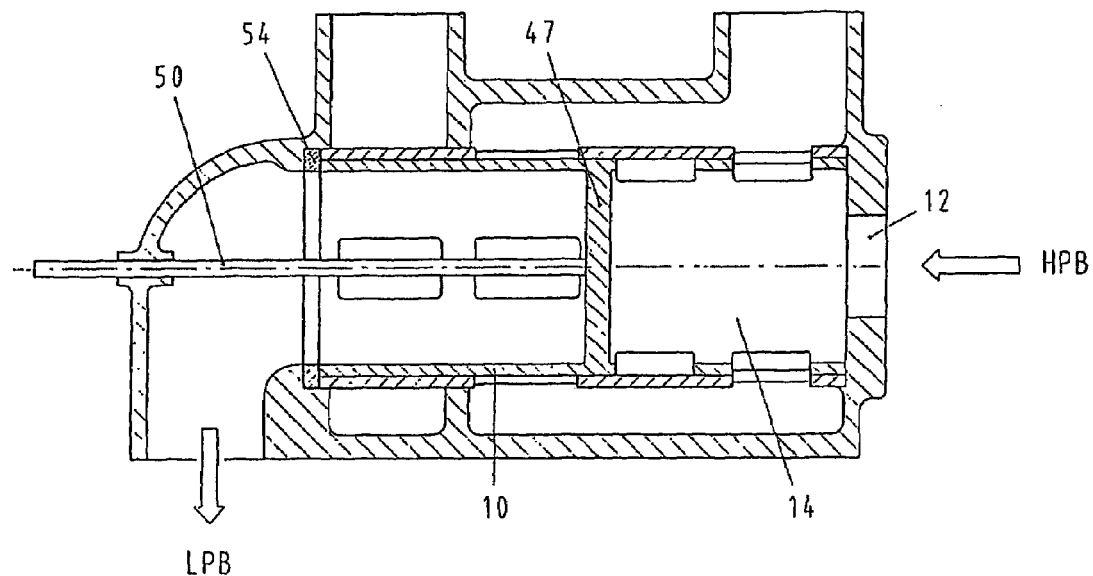
Fig. 6 (A – A)
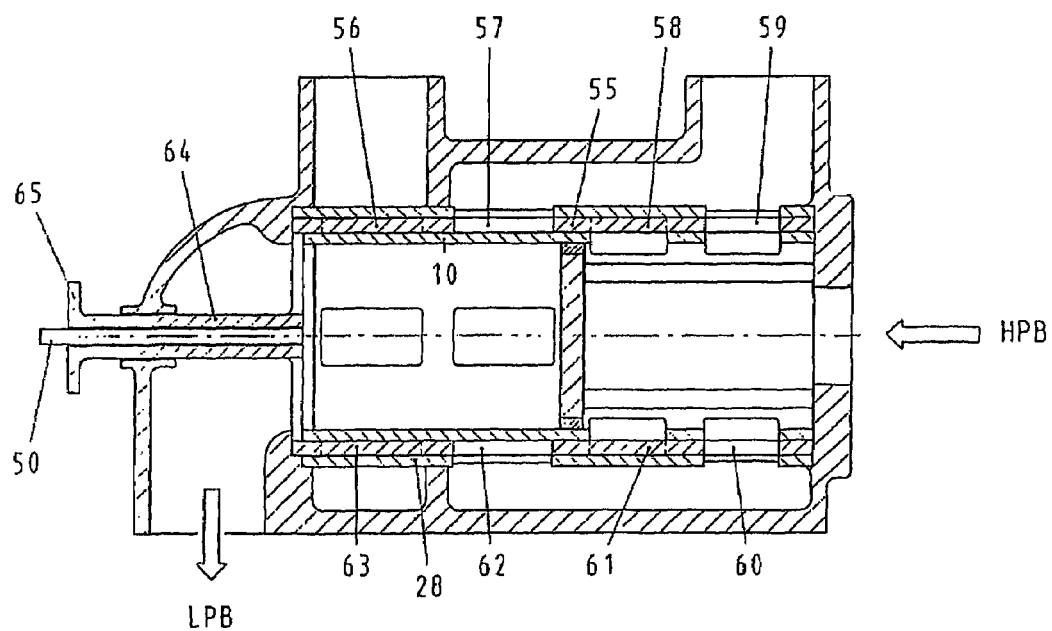
Fig. 7 (A – A)

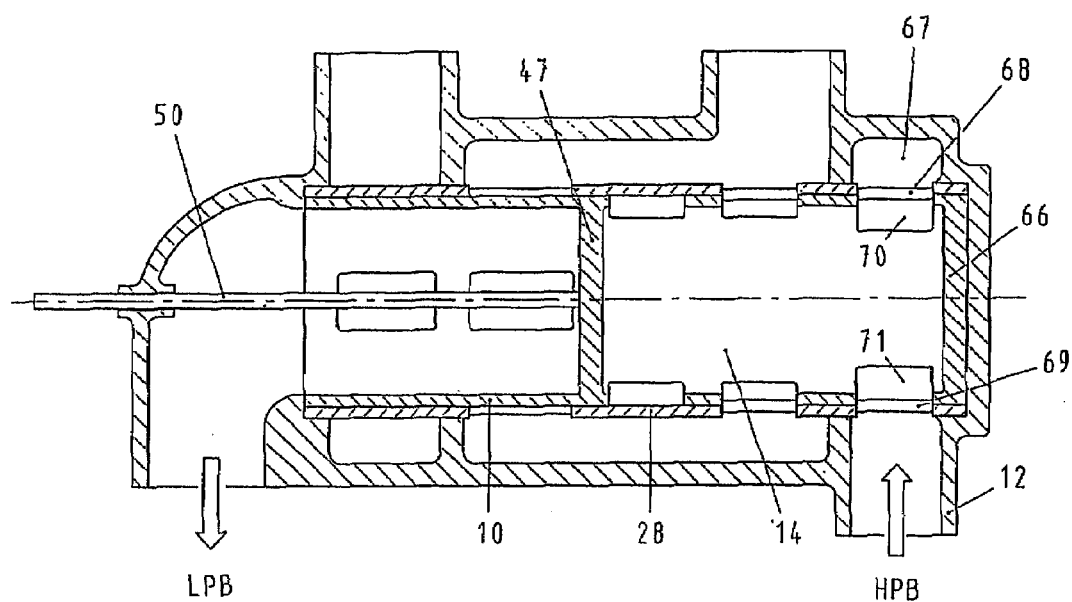
Fig. 8 (A – A)
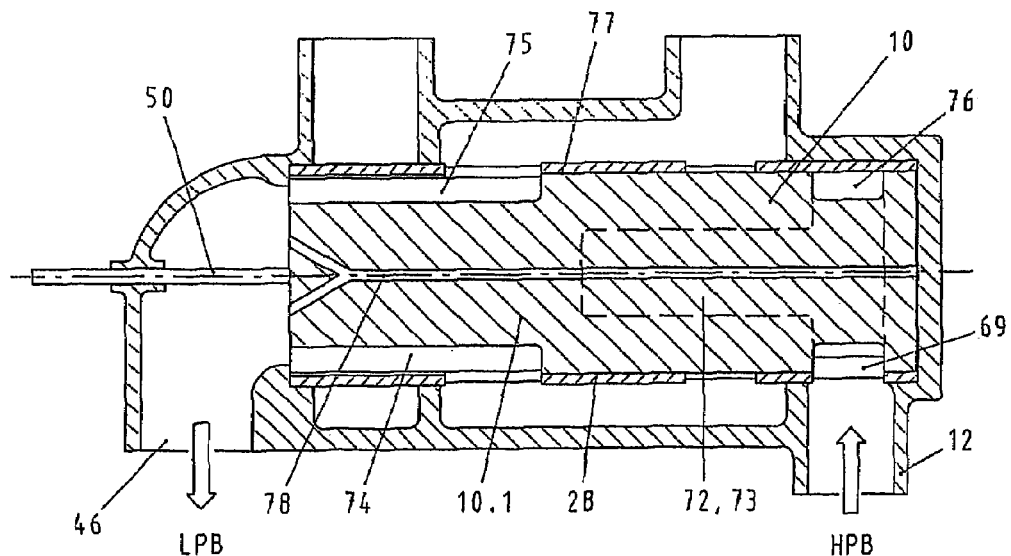
Fig. 9 (A – A)

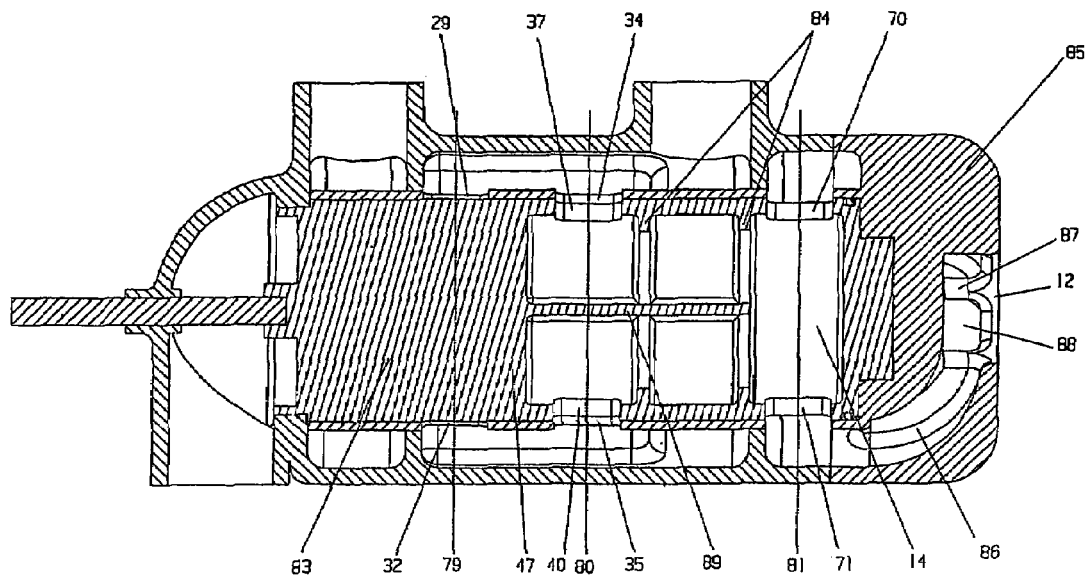
Fig. 10a (A – A)
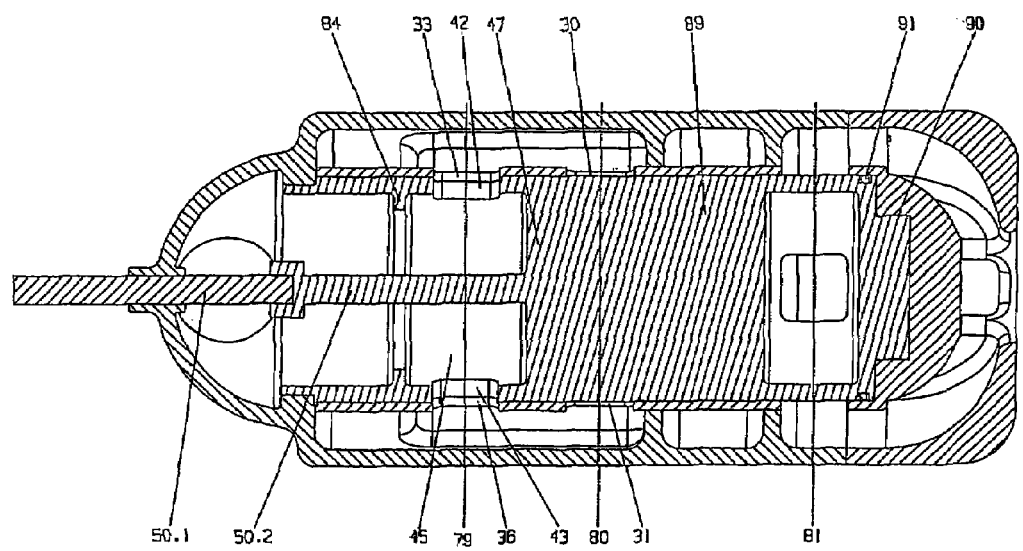
Fig. 10b (B – B)

VALVE UNIT FOR PRESSURE EXCHANGER INSTALLATIONS

CROSS REFERENCE TO RELATED APPLICATIONS

This application is a continuation of international patent application no. PCT/EP2004/001532, filed Feb. 18, 2004 designating the United States of America, and published in German as WO 2004/080576 on Sep. 23, 2004, the entire disclosure of which is incorporated herein by reference. Priority is claimed based on Federal Republic of Germany patent application nos. DE 103 10 663.4 and DE 10 2004 002 547.9, filed Mar. 12, 2003 and Jan. 17, 2004, respectively.

BACKGROUND OF THE INVENTION

The invention relates to a valve unit, in particular for installations with pressure exchangers with tubular chambers through which flow occurs alternately, a rotatable control element with a plurality of flow paths being arranged within a housing, the housing having a plurality of connections for connection lines, the housing being connected to a first pipe system and, in each case, with an end of at least one tubular chamber, a respective other end of a tubular chamber being connected to a second pipe system with the intermediate connection of further valve units, the control element being provided with a motor-driven drive shaft and the flow paths of the control element being alternately connected to openings arranged in the housing.

Pressure exchangers of this type comprise two or more tubular chambers, whose ends are provided with valve units. The tubular chambers are alternately subjected to fluids of different energy content by appropriately opening and closing the valve units. Within the tubular chambers, it is therefore possible to transfer, in an installation or in a technical installation process, a high pressure of one fluid to another fluid which only has a low pressure. With the aid of such pressure exchangers, savings in energy costs can therefore be achieved within installations and pumps for increasing pressure can be made smaller.

A reverse osmosis process is often used for treating water. In this arrangement, a fluid flow to be cleaned is forced at high pressure through a membrane system which, in the case of large fuel quantities, consists of a large number of membrane modules. In such membrane modules, a separation into pure water and an enriched concentrate takes place through a membrane because, invariably, only a part of the fluid to be cleaned can flow through a membrane. The proportion which flows through the membrane emerges as pure water, also referred to as permeate, on the other side of the membrane as a usable proportion. The part which does not flow through the membrane leaves a membrane module as brine—a fluid concentrate enriched with salts and minerals—as an unusable proportion which is at high pressure. This pressure is approximately 2 bar below a module inlet pressure of approximately 65 bar.

U.S. Pat. No. 5,306,428 discloses a reverse osmosis installation in which pressure exchangers in the form of tubular chambers are used for recovering energy. With the aid of these tubular chambers, the pressure of the energy-rich brine flowing away from the membrane module, which is still high, is transmitted to a fluid which still has to be cleaned. A lower pump drive power, by the amount of this increase in pressure, is therefore necessary in order to generate the high pressure necessary for the reverse osmosis process in the fluid to be introduced.

In order to control and/or switch over the fluid paths, of the brine in and out of the tubular chambers of the pressure exchanger, a valve unit with a rotating control element is used, together with other valve units. With the aid of this control element, the tubular chambers of the pressure exchanger are alternately subjected to the brine emerging from the membrane modules. The rotating control element is configured as a cylinder in which connecting ducts are arranged in the manner of a 3-way valve. During the switch-over procedures, all the flow paths are completely blocked. In order to avoid pressure surges during such switch-over procedures, pressure balance ducts are arranged within the cylinder.

The separation capability of a membrane decreases as a function of the duration of operation of the membrane and a fluid to be cleaned must remain correspondingly longer within a membrane module. For this reason, the switch-over times of the cylinder are influenced, in the prior art, with the aid of a servomotor. This valve unit, however, is only suitable for small reverse osmosis installations because the flow cross sections within the valve unit are approximately the same size as the flow cross sections of the ducts to be filled. In the case of large installations, and the fluid columns to be displaced in them and the forces caused by this, a substantial dimensioning problem arises for the valve unit.

SUMMARY OF THE INVENTION

The object of the invention is to provide a switch-over device or valve unit, particularly for large reverse osmosis pressure exchanger installations, which can distribute large fluid flows, simply and without difficulty, between different tubular chambers of the pressure exchanger.

In a valve unit of the aforedescribed type, the solution of this problem provides, within the housing, for a supply flow to the control element occurring from the axial and/or radial direction and an outlet flow occurring in the axial direction from the control element. A minimum installation length of the valve unit can be achieved in the case of axial supply and outlet flows. Although, in the case of radial supply flow, on the other hand, the valve unit is somewhat longer, the axial thrust which arises can be dealt with more easily.

One advantageous embodiment provides for the control element to be configured as a hollow cylindrical control element and for a separating wall dividing the hollow cylindrical control element into two spaces of different pressure regions. This permits the formation of additional spaces, in which a flow deflection occurs for a fluid to be exchanged, within the valve unit. In consequence, a simple, thin-walled component, which is easier to control during the switch-over processes, can be used for the actual control and sealing functions of the valve unit. To this end, a further embodiment provides for additional stiffening features to be arranged in the spaces of different pressure regions. Such stiffening features are configured as ribs or wall elements subdividing a pressure region through which flow occurs in the flow direction. The additional stiffening features can likewise be configured in the form of annular elements. These can be segments or peripheral parts. They improve the stiffness of the hollow cylindrical control element when it is subjected to different pressure ratios, thus resisting deformation of the component.

Different embodiments for actuating the hollow cylindrical control element provide for the drive shaft to be connected to the separating wall so as to transmit torque, for the separating wall to be arranged in the central region of the hollow cylindrical control element, for a component which transmits torque to be arranged on one end surface of the hollow cylindrical control element, for the separating wall to be solidly connected to the control element, or for the separating wall to be solidly connected to the housing. A drive shaft can therefore be connected directly or indirectly to the control element. This depends on the most favorable mode of manufacture. If the separating wall is arranged in the central region of the hollow cylindrical control element, the subdivision into two pressure spaces is ensured. The separating wall, which subdivides the control element into two pressure regions, can then be fastened directly on the control element or be connected to the housing.

For this purpose, in preferred embodiments the separating wall is fastened to the housing with struts in the vicinity of a high-pressure supply opening. Sealing elements can then be arranged between the separating wall, which is then stationary, and the rotating inner wall surface of the hollow cylindrical control element. The separating wall and/or the separating wall with struts connected to the housing can also be configured as an exchangeable insert. This facilitates assembly and maintenance operations, and the fastening of the separating wall to the housing permits an arrangement of the control element which is free from axial thrust.

In another advantageous embodiment, the control element is configured as a full cylinder, and a plurality of groove-shaped flow paths form different pressure regions in its peripheral surface. This different type of manufacture improves the strength properties. To this end, in further preferred embodiments the flow paths of equal pressure regions are arranged diametrically opposite one another on the peripheral surface, thus creating a pressure equilibrium.

Provision is also made for a section of the groove-shaped flow paths connected to a flow opening to form the control opening of the control element and for a peripheral annular groove in the housing and/or in the peripheral surface of the control element to be arranged in the vicinity of a radial high-pressure supply opening. This provides better additional radial connection possibilities. In addition, a closed annular sealing zone is arranged on the control element between ends of the groove-shaped flow paths of the different pressure regions and sealing elements are arranged in the vicinity of the sealing zone on the control element and/or on the housing. An axial thrust relief is achieved between the end surfaces of the control element via a pressure-relief duct arranged in the control element. Consequently, it is possible to dispense with additional thrust bearings.

The pressure loading on the housing is optimized by control pockets on the outer periphery of the control element. These have a forked and/or stepped configuration and are connected to control openings. In consequence, there is a targeted internal pressure loading of the housing with high pressure in the region of the control pockets in order to act against external housing loads. In addition, due to the control pockets, there is a further flow path through which a brief connection is permitted between the connected tubular chambers. By this means, a section of the flow transfer ducts is only briefly displaced into the control element.

Due to the fork-shaped configuration of the control pockets, approximately continuous volume flows and pressure ratios are maintained within the valve unit during the switch-over. Protrusion elements located in the actual fork are arranged in the plane of the radial stiffening ribs. This measure likewise improves the force transfer within the valve unit. In an analogous manner, fork-shaped and/or stepped flow pockets, which are also connected to flow openings, can be arranged on the inner periphery of the housing inner wall.

In another advantageous embodiment of the invention, a plurality of flow-transfer ducts connecting the flow openings are arranged on and/or in the outer wall of the housing. These ducts enable an exchange of the fluid out of and into the tubular chambers to occur during the working strokes of the pressure exchanger, with the valve unit ensuring that each connected tubular chamber is always filled from the region of the incoming fluid and is emptied into the region of the outgoing fluid. In order to be able to adjust the control periods of the pressure exchanger, the flow openings arranged in the housing may be constituent parts of an adjustable, hollow cylindrical housing inner wall. An additional hollow cylindrical housing wall of this type may be fashioned as a separate component and can be arranged so that it is rotated, together with the flow openings arranged within it, relative to the housing. In this way, an overlap time can, if required, be matched to the control openings arranged on the control element. Depending on the configuration of the valve, this can take place during operation of the pressure exchanger or when the valve unit is being installed in the pressure exchanger installation.

In addition, a plurality of access openings are arranged in the outer wall of the housing. In the case of a cast housing, they facilitate the manufacture and machining processes. They are closed by known types of closing elements, such as plugs, screwed elements and similar components. In order to increase the housing stiffness, a plurality of external stiffening elements are arranged on the outer wall of the housing. These can be arranged peripherally or only as external housing pockets. For weight and manufacturing reasons, the housing pockets are arranged between the flow-transfer ducts.

In addition, the tubular chambers of the pressure exchanger can be briefly connected to one another by the flow-transfer ducts during a motion of the control element. If, advantageously, the control openings extend at the high-pressure end over an angular range which is different from that of the associated flow openings, a switch-over with minimum pressure surges occurs. The angle between the openings is dimensioned in such a way that when the opening for a first tubular chamber has just closed, thereby terminating the flow of high pressure liquid therethrough, the opening for a second tubular chamber has just opened and it therefore takes over the high-pressure flow. This ensures that a fluid, which still has to be cleaned and is located at the other end of the tubular chambers, is always under high pressure.

The flow-transfer ducts can also be configured as external tubular elements, in which case a plurality of connections for the tubular elements are arranged so that, for easier assembly, they are distributed over the outer periphery of the housing. In another embodiment, the flow-transfer ducts are configured as flow ducts which are integrated into the housing wall. This reduces the number of sealing locations.

Another advantageous embodiment provides for a fluid exchange between control element and the flow-transfer ducts via, in each case, at least two mutually diametrically opposed flow openings and control openings which correspond to the flow openings. A symmetrical arrangement of the openings and the flow ducts provides, within the housing, support of the control element which is free from radial thrust.

In order to achieve gentle switching, the openings of the hollow cylindrical control element may be configured, for example, as elongated holes, polygons or in some other shape. The position on the control element and the size of the control openings permit a flow switch-over which is free from pressure surge. A closing of a control opening by an adjoining tubular chamber is simultaneously associated with an opening of a previously closed, different control opening by a further tubular chamber and vice versa. As a result of the enlarged control openings or due to their position on the control element, an overlap can be achieved by the flow transfer paths with the flow openings solidly arranged in the housing. The overlap then has a favorable effect on the switching and the behavior of the flowing liquid columns influenced by it.

During the operation of the valve unit, different pressure conditions exist at the periphery of the control element in alternating regions. In order to facilitate the switch-over motion of the control element, the control element can be provided with a plurality of pressure-relief ducts on the external periphery. In this way, specific zones of the sliding surface are subjected to a defined back pressure. This type of pressure-relief duct can also be arranged on the outer wall surface of the control element and/or on an opposite valve unit housing surface. Depending on their shape and configuration, a continuous or alternating through-flow takes place in the pressure-relief ducts.

A favorable manufacturing possibility arises if the control element is rotatably supported on a housing surface which extends in a meander shape, or if a housing inner wall configured as a separate component is supported on a housing surface which extends in a meander shape. Between the arms of the meander, a type of branch ducts which simultaneously act as flow-transfer ducts within the housing, is then formed. In this way, a housing of this type can be manufactured at relatively low cost because unfavorable undercuts are avoided. The control element can likewise be rotatably supported on a plurality of individual surfaces of the housing.

Only when a control element with fixed separating wall is used does it become necessary to provide a thrust bearing on which the control element is supported within the housing. In principle, control elements in which the high-pressure end is configured between two fixed separating walls do not require a thrust bearing. In the case of the latter variant, it has been found advantageous for an annular space arranged in the housing to be connected to the high-pressure end. This permits simple sealing in the region of the connections.

Other advantageous embodiments provide for the housing to be provided with one connection for connection to each tubular chamber and with one connection each for a high-pressure end supply opening and a low-pressure end outlet opening. In this way, the number of sealing locations on the valve unit can be minimized. The housing can then be provided with an axial and/or radial arrangement of the high-pressure supply opening. An axially arranged supply opening is arranged on an end surface of the housing, with the first pipe system being connected to such a high-pressure supply opening. This configuration facilitates the sealing of the valve unit in a simple manner because, in this case, only one static seal is necessary.

In this regard, other advantageous embodiments provide for the high-pressure supply opening to be fitted downstream of a flow deflector having support elements and for the flow deflector to surround a bearing arrangement for the control element. This measure likewise serves to reduce the installation length and to improve the stiffness. And because the high-pressure end supply opening with the flow deflector and the bearing arrangement are arranged in a cap part, there is improved support for the control element with a simultaneously simplified manufacturing possibility. The housing can likewise be provided with an axially and/or radially arranged low-pressure end outlet opening.

BRIEF DESCRIPTION OF THE DRAWINGS

The invention will be described in further detail hereinafter with reference to illustrative preferred embodiments shown in the accompanying drawing figures, in which:

FIGS. 3a and 3b are sectional views, offset by 90°, of the valve unit of FIG. 2 in a first operating condition;

FIGS. 4a and 4b are sectional views, offset by 90°, of the valve unit of FIG. 2 in a second operating condition in which the control element is rotated by 90° relative to FIGS. 3a and 3b;

FIG. 6 is a depiction of an embodiment with a drive member on a separating wall;

FIG. 7 is a representation of a valve unit with an additional control cylinder;

FIG. 8 is a representation of a valve unit with two separating walls;

FIG. 9 is an illustration of a valve unit with a control element in the form of a full cylinder, FIGS. 10a and 10b depict sectional views, offset by 90°, of a shorter valve unit in a first operating condition.

DETAILED DESCRIPTION OF PREFERRED EMBODIMENTS

Figure 1:
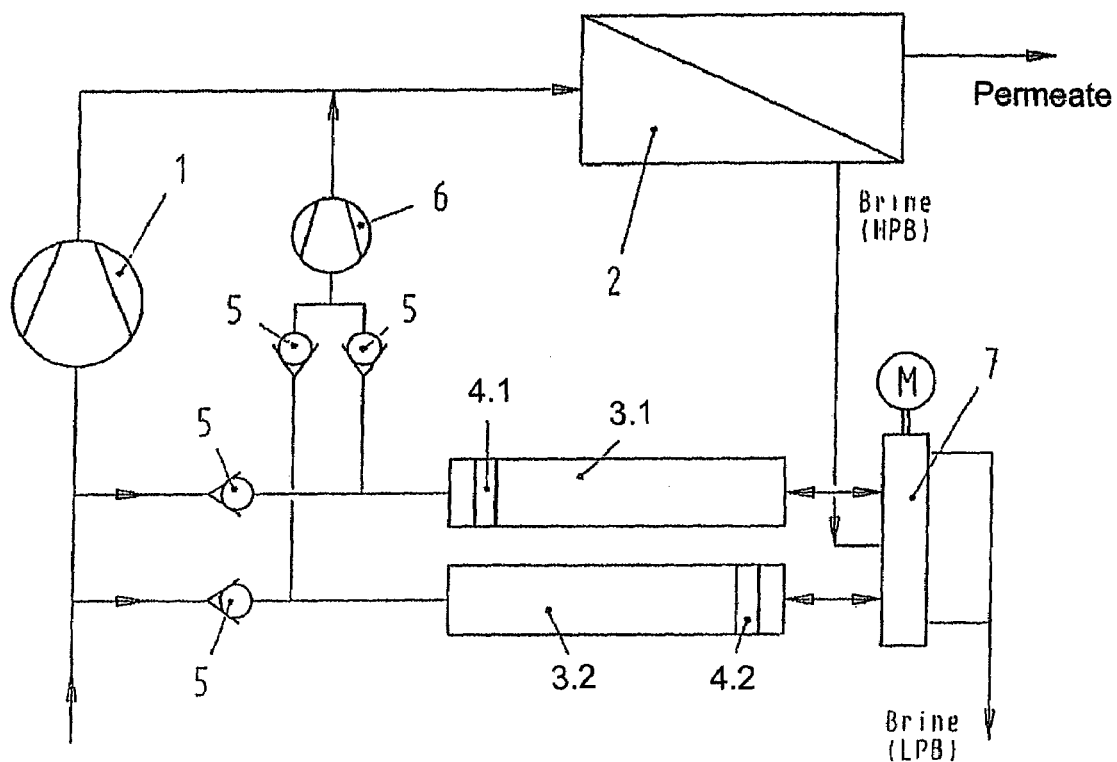
FIG. 1 is a diagrammatic representation of a conventional pressure exchanger installation.

FIG. 1 shows a mode of operation of a valve unit according to the prior art, using a reverse osmosis installation as an example. A high-pressure pump 1 delivers a fluid which has to be cleaned, generally water in the form of lake water, sea water, brackish water or, indeed, drainage water, to one or a plurality of reverse osmosis modules 2. Because of the high osmotic pressure within this module 2, a separating effect occurs on the membranes arranged within it. Behind the membranes, cleaned water, the so-called permeate, flows away at low pressure, is collected and supplied for further use.

An unpurified fluid flowing away from the reverse osmosis modules 2, the so-called brine, has a higher concentration density of pollutants, generally salts, after the separation process and is conducted away to the original source. Because of its high energy content in the form of pressure energy, the brine is led via a valve unit 7 to the energy recovery process in a two-chamber pressure exchanger. In its tubular chambers 3.1, 3.2 are arranged displaceable separating pistons 4.1, 4.2, which are under the influence of pressure and form a separation between two respective spaces differently subjected to pressure. Installations with tubular chambers without separating pistons are also known but undesirable mixing between the different fluids can occur in them if the system departs from equilibrium or the control periods are no longer correct.

With this arrangement, the high pressure of the brine forces a piston 4.1, which is located in a first tubular chamber 3.1 (the upper tubular chamber in FIG. 1), toward the side located remote from the valve unit 7 and transmits the pressure onto a fluid located in the chamber on the other side of the piston.

The high pressure is then transferred to a lower-pressure fluid, which has to be cleaned and is located to the left of the piston. This fluid then flows out at an already higher pressure on the left-hand side of the upper tubular chamber 3.1 and, through non-return valves 5, to a booster pump 6, which is arranged within a second pipe system. with the aid of the booster pump 6, compensation is then provided for the pressure drop, which is still small, which occurs during the osmotic cleaning process in the modules 2. Because of the energy recovery, the booster pump 6 only has to produce that pressure difference which was lost within the reverse osmosis module. The high-pressure pump 1 can therefore be made substantially smaller, and can therefore be more cost effective, than it is in the case of an installation without energy recovery.

When the piston 4.1 reaches the chamber end within the first tubular chamber 3.1, the valve unit 7 is switched over so that a connection to the atmosphere is now created for the first tubular chamber. The upstream pressure within a suction line leading to the main pump 1 is sufficient to force, by means of a fluid still to: be cleaned, the brine, which is now pressure-relieved and is located in the first upper tubular chamber 3.1, toward the right again out of the upper tubular chamber 3.1 so that it flows away to the atmosphere. During the expulsion process of the brine from the first tubular chamber 3.1, the lower second tubular' chamber 3.2 is simultaneously subjected to the high pressure of the brine by means of the valve unit 7. The expulsion process of a pressure-relieved brine is shown in the second, lower tubular chamber 3.2.

By appropriate cyclic switching of the valve unit 7, the two tubular chambers 3.1, 3.2 are alternately subjected to pressure, thus providing an efficient recovery of energy. Because of the 3-way function within the valve unit, pressure surges can occur during the switch-over process and this endangers the membranes within the reverse osmosis module 2. Additional special pressure compensation openings are therefore to be provided in the control element of the valve unit 7 in order to minimize this danger. A further disadvantage arises due to a radial thrust, which occurs during the switch-over motion and for which there is no compensation.

Figure 2:
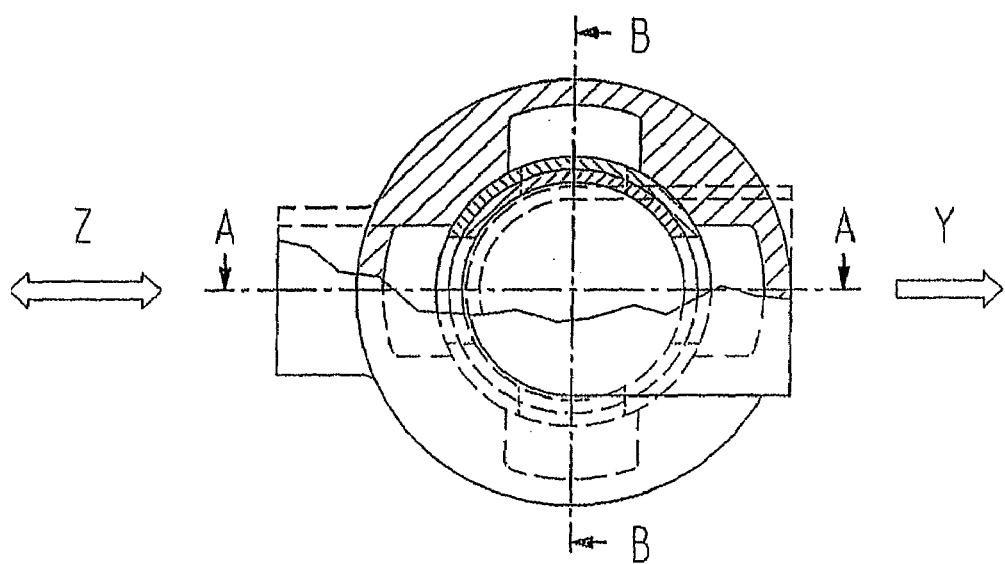
FIG. 2 is a cross sectional view of a valve unit with section lines showing the planes of FIGS. 3a to 7.

In FIG. 2, a cross section through a valve unit according to the invention, two sectional planes A-A and B-B are arranged offset by 90° to one another and, with the aid of these, the mode of operation of the valve unit is explained in the subsequent figure descriptions. In this figure, a double arrow Z shows the flow direction from and to the tubular chambers not shown here—of a pressure exchanger; the single arrow Y shows the outlet flow direction of a pressure-relieved brine flowing out of the valve unit.

FIGS. 3a and 3b show, in two sections which are respectively arranged offset by 90° to one another, a valve unit according to the invention. The position of the sections A-A and B-B may be taken from FIG. 2 and, in the case of these sectional representations, the position of a hollow cylindrical control element 10 always remains unaltered.

The hollow cylindrical control element 10 is rotatably arranged in the housing 11 of the valve unit. The brine at high pressure, referred to below as high-pressure brine (HPB), flows out of the reverse osmosis modules 2 and enters a high-pressure space 14 of the valve unit through a single high-pressure end supply opening 12 with the aid of an upstream collector—not shown. This example shows a valve unit for connection to a twin-tube pressure exchanger analogous to the representation of FIG. 1. For this reason, the representation of the tubular chambers connected to the valve unit has been omitted.

The housing 11 of this valve unit has two connections 16, 17 on the outer wall 15, to which pipelines—not shown—are connected for connection to tubular chambers 3.1, 3.2, likewise not shown. The illustrative embodiment of the housing 11 in this arrangement is provided with integrated flow ducts 18-21 and two annular spaces 26, 27, with the aid of which a connection takes place between the connections 16, 17 and the flow openings 29-36 arranged on the housing inner wall 28. For development reasons, the housing inner wall 28 is here configured as a hollow cylindrical wall element, which is arranged so that it seals in the housing 11. It can also be a fixed constituent of the housing 11 when the "latter is, for example, configured as a cast construction. The housing inner wall 28 acts simultaneously as the radial support for the hollow cylindrical control element 10. The wall of the control element 10 is penetrated by a plurality of control openings 37-44.

In the representation of FIG. 3a, a high-pressure brine, which is designated by an arrow HPB, enters the high-pressure space 14 of the housing 11 through the supply opening 12. The high-pressure space 14 is arranged within the control element 10 and is bounded in the axial direction by an end wall 13, which is solid with the housing, and a separating wall 47. In this illustrative embodiment, the separating wall 47 is sealed relative to the control element 10 with the aid of seals 49. And the separating wall 47 is connected, so that it cannot rotate, by struts 48 to the housing 11, in particular to the end wall 13 in this case. By means of this development configuration, the rotatable control element 10 is relieved of axial pressure forces during its switching motions. Solutions known per se can be used for the seal 49.

Control openings 37-40 arranged in the region of the high-pressure space 14 in the control element 10 have, in this configuration, a different opening angle from that of the corresponding flow openings 30, 31, 34, 35 in the housing inner wall 28. An appropriate selection of an opening angle achieves the effect that, for a short period during the switch-over by the control element 10, the tubular chambers—not shown here—in effective connection with the valve unit by means of the connections 16, 17 are simultaneously under high pressure from the supply opening 12. In consequence, the pressure fluctuations endangering the membranes of the reverse osmosis installation are avoided.

The control element 10 is rotatably arranged in the housing 11. Approximately in the central region of the housing is located the separating wall 47, which is rotationally fastened to the housing 11 by means of struts 48. The separating wall 47 effects, within the control element 10, a subdivision into two spaces 14, 45 with different pressure regions. The space 14, in this configuration, is continually connected to the high-pressure region HPB of the membrane modules. In contrast, the other space 45 located to the left of the separating wall 47 in FIG. 3a is connected to a connection 46 for the low-pressure region, designated by the arrow LPB, of the pressure-relieved brine flowing back from the tubular chambers. Because the control element 10 moves relative to the separating wall 47, a seal 49, which is suitable for the pressure ratios to be sealed, is provided.

The control element 10 is driven by a drive shaft 50, one end of which is led to the outside through a housing penetration 52 at the low-pressure end. The rotational motion takes place continually or in steps and the speed is determined as a function of the other system components.

The mode of operation of the switch-over valve unit according to the invention, as represented in FIGS. 3a and 3b, is as follows in the case of an unaltered position of the control element 10:

A high-pressure brine HPB flows into the high-pressure space 14 through a single supply opening 12, which is axially arranged in this case. This development reduces the number of connections and the total volume of the valve unit. The supply opening 12 for feeding the high-pressure brine HPB can also, of course, be radially arranged but the valve unit must then have a longer configuration and the supply must take place in a housing region in which there is no overlap with the control element 10. The low-pressure brine LPB is drained from the valve unit from the connection 46. Fundamentally, the valve unit ensures that, of the tubular chambers connected to the connections 16 and 17, one of them is always filled with high-pressure brine and, from the other, the low-pressure brine, which is then pressure-relieved, can be emptied. it is only for a short period during the switch-over that both tubular chambers receive high pressure simultaneously.

First Operating Condition (FIGS. 3a and 3b)

The high-pressure brine HPB flows from the high-pressure space 14 through mutually opposite control openings 38 and 39 located in the control element 10 and through flow openings 30 and 31, again mutually opposite and located in the housing inner wall 28, into an annular space 27 integrated in the housing 11, see FIG. 3b. Two separating walls 24, 25, which partially bound the annular space 27 in the axial direction, simultaneously form a support for the housing inner wall 28. The high-pressure brine HPB flows out of the annular space 27 to the connection 17 of a first tubular chamber. The other flow openings 34, 35 to the ducts 20 and 21, which form a flow path to the annular space 26 and to the connection 16 within the valve unit, are blocked by the control element 10. By this means, the first tubular chamber located at the connection 17 is filled.

At the same time, the valve unit is in effective connection, via the connection 16, with the other, second tubular chamber. From this, a low-pressure brine LPB, pressure-relieved in the second tubular chamber, flows back to the valve unit and enters, via the connection 16, an annular space 26 and, through mutually opposite flow openings 33 and 36 and via control openings 41 and 44, likewise mutually opposite and located in the control element 10, the low-pressure space 45. From there, the low-pressure brine LPB flows into a connection 46, so that the tubular chamber is emptied to the atmosphere end. All the other flow openings 29, 32, which are arranged in the housing inner wall 28 and lead to the ducts 18 and 19, are shut off by the control element 10. Two separating walls 22, 23, which partly bound the annular space 26 in the axial direction, simultaneously form a further support for the control element 10, see FIG. 3a.

The high-pressure brine, which flows through the connection 17 into the first tubular chamber, transfers its pressure energy to a fluid, which has still to be cleaned and is located in the first tubular chamber, which fluid is subsequently forced at higher pressure to the reverse osmosis modules. The rotational speed of the drive to the drive shaft 50 (not shown) and the selection of the opening cross section of the control openings 37-40 ensure that, shortly before the tubular chamber at the connection 17 is completely filled with high-pressure brine, the filling process is terminated. At the same time, the emptying process of the second tubular chamber at the connection 16 is likewise terminated.

The respective pairs of interacting and mutually opposite openings 38/30 and 39/31 at the high-pressure end, however, remain open somewhat longer than the pair of the openings 41/33 and 44/36 at the low-pressure end. In consequence, a tubular chamber located at the connection 16 now obtains pressure, which is already high, through the pairs of openings 37/34 and 40/35, the ducts 20 and 21 and the annular space 26, whereas the pairs of openings 38/30 and 39/31 are just closing. This ensures that the second operating condition with the change of the flow direction to the tubular chambers begins without pressure surge.

Second Operating Condition (FIG. 4a/4b):

In these figure representations, in contrast to the representations of FIGS. 3a and 3b, the control element 10 is shown rotated by 90° within the housing 11 and the flow ratios at the connections 16, 17 to the tubular chambers have reversed. An illustration of intermediate positions during a rotational motion is omitted for reasons of better comprehensibility.

If the pairs of openings 38/30 and 39/31 are in the closed position, the tubular chamber which now has to be filled is further filled at the connection 16. In contrast, the tubular chamber at the connection 17 is emptied through the annular space 27, through the mutually opposite ducts 18 and 19 and the mutually opposite pairs of openings 29/42 and 32/43 and through the low-pressure space 45 and the connection 46. In the second operating condition, the pressure energy of the high-pressure brine HPB is transmitted into the tubular chamber at the connection 16, whereas the tubular chamber at the connection 17 is emptied. Towards the end of the process, in a manner analogous to the first operating condition, the pairs of openings 37/34 and 40/35 and also 38/30 and 39/31 are simultaneously open for a short period so that a transfer into the first operating condition without pressure surge can, once again, take place.

The control element 10 is equipped with a sealing element 49, on its inner and/or outer peripheral surface, in this case in the region of the separating wall 47. This prevents a transfer flow between the high-pressure and low-pressure ends and, in consequence, maintains the efficiency of the overall system. A plurality of such sealing elements 49 on the control element 10 can also be used to suit the dimensioning of such an installation.

A drive shaft 50, with the aid of which the control element 10 is put into rotation, is supported by conventional bearing elements and secured against the emergence of fluid by means of known sealing elements. The force transfer between drive shaft 50 and control element 10 takes place by means of force transfer means 51 known per se. These can be. struts, disk elements or any other means which permit a flow passage from the low-pressure space 45 to the connection 46. The introduction of force takes place in the example of FIG. 3a to 4b, at the end surface of the control element 10.

Figure 5A:
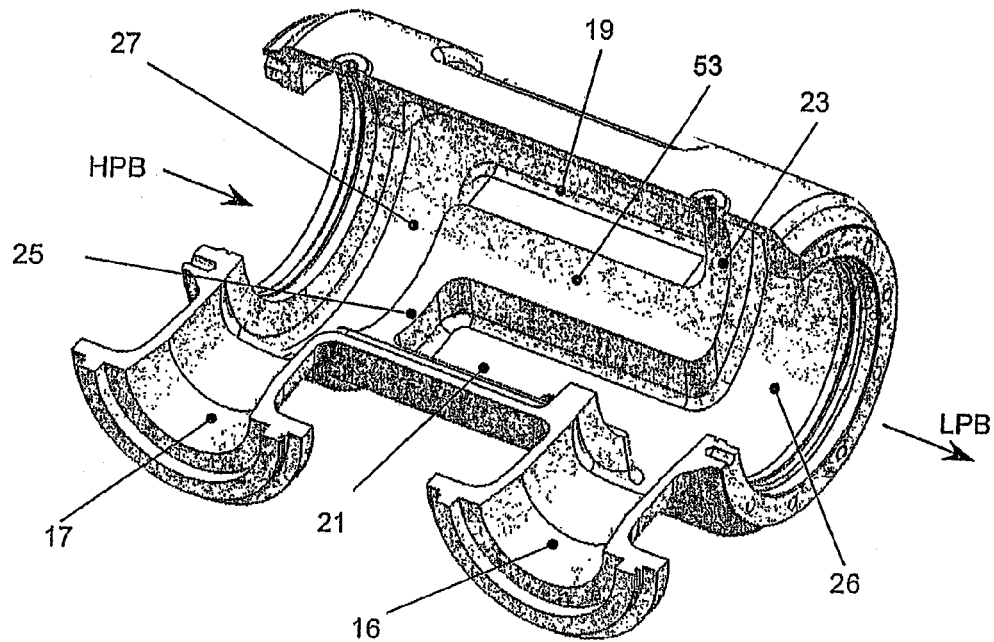
FIGS. 5a and 5b are three-dimensional views of the valve unit in partial section.

FIG. 5a is a three-dimensional view onto a partially opened housing 11 of the valve unit. Only the housing 11, without the separate housing inner wall 28 used in the illustrative embodiment, is shown. This makes it clear that the total of four ducts 18 to 21 emerging from the annular spaces 26, 27 represent a type of branch ducts, the wall parts formed between them having a meander-shaped course. As a result, there are surfaces 53, which likewise extend in meander shape and which act as bearing surfaces for supporting the housing inner wall 28. The end surfaces or narrow sides of the separating walls 22 to 25 simultaneously have, in this case, the functions of bearing surfaces. The housing inner wall 28 can also be designed as an integral constituent of the housing 11. By means of such a configuration of the flow guidance within the housing 11, respectively mutually opposite flow ducts or flow openings can be created which make possible a motion of the control element 10 which is free from radial forces.

Figure 5B:
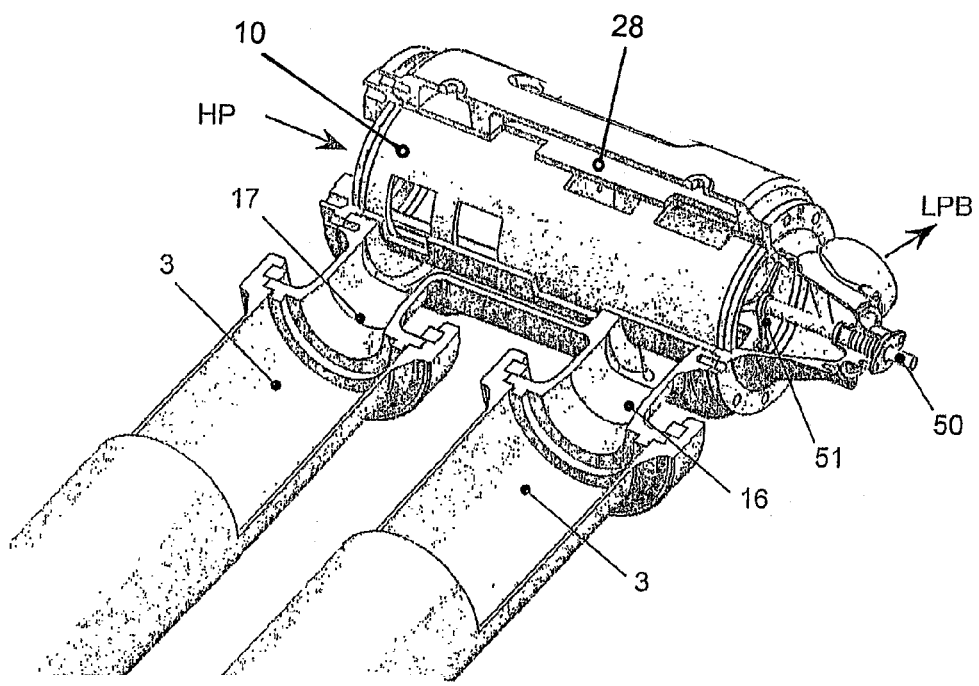

FIG. 5b shows, in a corresponding arrangement to FIG. 5a, a section through an installed valve unit which is ready for operation. Its connection stubs 16, 17 are directly connected to two tubular chambers 3.2, 3.1. The hollow cylindrical control element 10, which is provided with the control openings 37-44, rotates within the housing inner wall 28, which is provided with the flow openings 29-36. The drive of the control element 10 takes place at its end surface by means of the sealed drive shaft 50, which acts on a star-shaped force transfer element 51. The flow guidance, which is here better recognizable due to the sectional representation, corresponds to the representation of FIGS. 3a and 3b.

FIG. 6 shows a simplified construction of the valve unit according to the invention. In this case, the separating wall 47 is configured as a fixed constituent of the control element 10. The fastening of the separating wall 47 can take place by conventional means. In the example, the separating wall 47 is configured as an integral constituent of the control element 10, which is possible by means of the cast, welded or other known technical type of connection. This dispenses with the fastening of the separating wall 47 by means of struts to the housing 11, as shown in FIGS. 3a-4b. The drive of the control element 10 takes place directly to the separating wall 47 by means of the drive shaft 50, which dispenses with further, otherwise necessary connecting means 51 between drive shaft 50 and control element 10. Because the separating wall 47 separates the inside of the valve unit into two regions at different pressures, a resultant axial force on the .:control element 10 is now to be expected. Such an axial force component acts in the direction of the high-pressure brine HPB flowing into the high-pressure space 14. This acts on the separating wall 47 and generates, a force component in the control element. This is absorbed by a simple additional axial support element 54 and is transferred to the housing 11.

An alternative development of the valve unit, with additional control possibilities for variable opening and closing times during the operation, is shown in FIG. 7. An additional control cylinder 55 is located concentrically between the housing inner wall 28 and the control element 10. The control cylinder 55 has the function of an additional hollow cylindrical housing inner wall, is designed as a separate component and can be rotated, with the flow openings arranged in it, relative to the housing. It has, opposite to the control element 10, further flow openings 56-63, whose extent on the periphery or whose cross section is smaller than or of the same size as the corresponding flow openings 29-36 of the housing inner wall 28. By means of an appropriate selection of the peripheral extent of these corresponding flow openings 56-63, it is possible to influence the opening and closing time of the valve unit by rotating the control cylinder 55. The adjustment of the control cylinder 55 can take place by means of a hollow shaft 64, which extends concentrically to the drive shaft 50 and can be adjusted by means of a flange 65. The development is executed in such a way that this can occur during the operation for adaptation to different operating conditions. A different type of adjustment can also be used. The illustrative embodiment shown is not limited to this type of adjustment.

FIG. 8 shows a solid connection between the control element 10 and the separating wall 47. This achieves greater stiffness of the control element 10 in the region of the high-pressure and low-pressure ends. In order to deal with an axial thrust then appearing and acting toward the left-hand drawing side in FIG. 8, a further separating wall 66 is arranged which terminates the high-pressure space 14 inside the control element 10 toward the right. This measure additionally increases the stiffness. The drive takes place directly to the separating wall 47 by means of the drive shaft 50. The high-pressure end supply opening 12 is radially arranged, for which purpose the control element 10 and the housing inner wall 28 are correspondingly lengthened. The high-pressure brine HPB flows through the radial supply opening 12 into an annular space 67, through two or more flow openings 68, 69 in the housing inner wall 28 and through two or more openings 70, 71 in the control element 10 into the high-pressure space 14. In this example, the openings 70, 71 in the control element 10 do not exercise any control function but only act, in a manner analogous to the supply opening 12, to fill the high pressure space 14.

FIG. 9 shows a control element 10.1 which is configured as a type of full cylinder. This provides a further increase in its stiffness. Respectively mutually and diametrically opposite flow ducts 72-73 and 74-75 are machined into the peripheral surface of the control element 10.1. In consequence, a sufficiently thick wall surface remains between the end regions of the groove-shaped flow ducts 72-75 and their thickness can be adapted in a simple manner to the pressure ratios then existing. The shapes of the groove-shaped flow ducts 72-75 are matched to the materials used in order to prevent notch stresses in the control element 10.1. In a manner analogous to a hollow cylindrical closing piece 10, the flow ducts 72, 73 serve the function of a high-pressure space and the flow ducts 74, 75 serve the function of a low-pressure space. A high-pressure brine HPB is supplied via a radially arranged high-pressure supply opening 12 and enters an annular duct 76, which can either be arranged in the housing or, as shown, in the control element 10.1. In both cases, the annular duct 76 is configured so that it is completely peripheral. With the aid of a relief duct 78, which extends through the control element 10. 1 in axial direction, a pressure exchange takes place between the surfaces on the axial end surfaces. At the same time, a free space is arranged, in this configuration, on the high-pressure end surface of the control element 10.1, this free space being represented in the drawing by the thick line shown on the right-hand side, by which means the appropriate surface for the pressure compensation of an axial thrust relief is created.

In the arrangement represented, the high-pressure brine HPB flows through a flow opening 69 in the housing inner wall 28 into the annular duct 76 of the control element 10.1, from which emerge groove-shaped flow ducts 72, 73, which each extend in the axial direction. From these high-pressure flow ducts 72, 73, the fluid flows to the flow openings 30, 31, 34 and 35 mentioned in the previous figures. The low-pressure flow ducts 74, 75 in the control element 10.1 accept the low-pressure brine LPB from the flow openings 29, 32, 33 and 36 mentioned in the previous figures and guide the fluid to the connection 46. Here again, a low-pressure brine LPB always emerges in the axial direction from the control element 10.1. Mutually facing ends of the respective flow duct 72-75 are arranged at a distance from one another and form, between them, a closed annular sealing zone 77. This prevents a flow transfer between the two pressure regions.

FIGS. 10a and 10b show a valve unit with shorter installation length and sectional representations, which are likewise arranged offset by 90° relative to one another. The position of the sections A-A and B-B is analogous to the representation. of FIG. 2 and, here again, the position of the control element 10 remains unaltered.

The valve unit of FIGS. 10a and 10b has a shorter installation length due—to a different arrangement of the flow openings. In the housing 11 and in the control element 10, the position of the flow openings 29-36 and the control openings 3,7, 40, 42, 43 are respectively referred to the opening planes 79, 80, which are arranged at right angles to the drive shaft 50.2 of the control element 10. In this embodiment, there is a saving of two opening planes relative to the other embodiments. This embodiment has, in total, only three opening planes, one opening plane 81 being used only for the supply flow to the high-pressure space 14. It is possible to dispense with the opening plane 81 if there is an axial supply flow to the control element.

In order to achieve the saving of the two opening planes, four flow openings are arranged distributed over the periphery in each of the opening planes 79, 80, of which flow openings, the openings 29, 32, 34, 35 are visible in FIG. 10*a*. In this embodiment with the two tubular chambers which can be connected, the four flow openings 30, 31, 34, 35 and 29, 32, 33, 36 are respectively arranged offset by 90° relative to one another in the opening planes 79, 80 on the housing inner wall 28. With the aid of control pockets 82 included in the control element 10, a transfer of a high-pressure brine HPB from one opening plane 80 occurs in the axial direction through the control element 10 to the second opening plane 79 of the housing 11. The function of a control pocket 82 is more clearly recognizable from the perspective representation of the control element 10 in FIG. 11.

Arranged in the internal space of the hollow cylindrical control element 10, there are additional stiffening features, which are configured as ribs 83, 89 and penetrate the spaces 14, 45 in the axial direction as a type of radially extending flow splitters. The stiffening ribs 83, 89 shown in section in FIG. 10*a* extend over the whole diameter of the hollow cylindrical control element 10 and improve its stiffness relative to the external and internal, and continually alternating, pressure loads which act on it. The planes of the stiffening ribs extending in the direction of the drive shaft 50.2 are rotated by 90° relative to one another and, in addition, abut directly on the separating wall 47.

Stiffening features, in the form of annular elements 84 in this case, are arranged in the internal space of the control element 10. These extend radially inward from the inner wall of the control element 10 and protrude into the internal spaces 14, 85 in annular shape. These stiffening annular elements 84 also improve, overall, the stiffness of the control element 10.

The supply opening 12 in this illustrative embodiment is a constituent part of a cap part 85, which is connected to the housing 11 so as to form a seal and transmit forces. The configuration as a cap part has the advantage that the housing 11 is, per se, mainly of cylindrical design and can therefore be manufactured more simply. A flow deflector 86 is arranged within the cap part 85. Within the flow deflector 86 are arranged a plurality of bearing elements 87, which bound a plurality of flow ducts 88 within the cap part 85. A high-pressure brine HPB from the arcuate flow ducts 88 and entering axially into the cap part 85 is deflected by means of the flow deflector 86 and, in consequence, flows axially or semi-axially from the outside into the control element 10 through its openings 70, 71 and into the space 14.

The control pockets 82 connected to the control openings 37, 40, and with a forked configuration in this case, are arranged at the outer periphery of the control element 10 and are located diametrically opposite to one another. In this illustrative embodiment, they extend on both sides of the stiffening rib 83 of the low-pressure space 45 and are only partially visible in this representation. In addition, a bearing arrangement 90 and seal 91 for the control element 10 are arranged in the cap part 85.

Arranged in the outer wall 15 of the housing 10, there is a plurality of access openings 92, which are closed by closing elements 93 so as to be pressure-tight and liquid-tight. These access openings 92 are provided for manufacturing technology reasons and substantially simplify housing manufacture. They permit easy access to the hollow spaces, in the form of the annular spaces 26, 27, within the housing.

FIG. 10*b* shows a longitudinal section arranged so that it is rotated by 90° relative to FIG. 10*a*. By this means, it can be recognized that, within the control element 10, the stiffening rib 83 is now at right angles to the plane of the drawing and is arranged in the manner of a flow part within the low-pressure space 45. on the right-hand side of the separating wall 47, in contrast, the stiffening rib 89 located in the high-pressure space 14 is now located in the plane of the drawing. In the illustrative embodiment shown here, the stiffening ribs 83, 89 are configured as an integral constituent part of the separating wall 47, the stiffening rib 83 being also, at the same time, a constituent part of the drive shaft part 50.2 located within the control element 10. This configuration simplifies the manufacture. The stiffening elements can equally well be arranged in the spaces 14, 45 without a direct effective connection to the separating wall 47.

From the joint viewing of the two FIGS. 10*a*, 10*b*, it may be recognized that, in the region of the space 45, all the control openings and flow openings 41-44 and 29, 32, 33, 36 are combined in one opening plane 79. In the region of the space 14, in a analogous manner, the control openings and flow openings 37-40 and 30, 31, 34, 35 are combined in the opening plane 80. The opening plane 81 is only used for the radial flow of the HPB into the space 14 and does not take part in the switch-over processes. overall, in consequence, there is a substantially shortened embodiment of a substantially improved stiffness of the overall valve unit.

Figure 11:
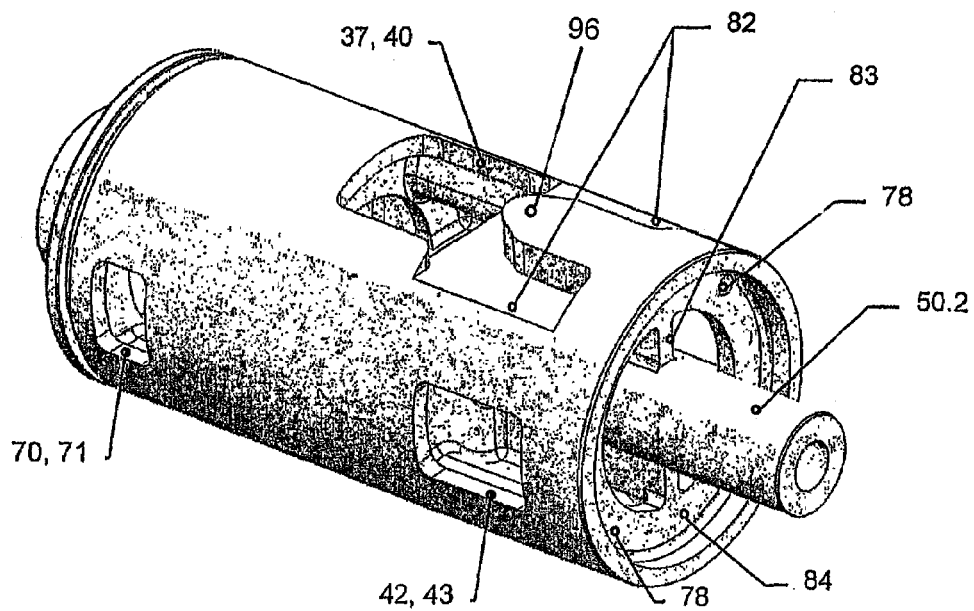
FIG. 11 is a perspective view of the control element of FIGS. 10a and 10b.

FIG. 11 shows a perspective view onto the hollow cylindrical control element 10, as shown in FIG. 10*a*, 10*b*. It is the view onto the low-pressure end of the control element 10 with the drive shaft part 50.2 protruding out of the space 45. Clearly visible is the rib 83, which is arranged within the space 45 and extends in the flow direction or in the direction of the drive shaft 50.2. Also visible is a stiffening annular element 84, which is arranged peripherally in the low-pressure space 45 in the region of its outlet flow end. A plurality of pressure-relief ducts 78 extending in the axial direction are arranged distributed over the periphery of the wall surface of the control element 10. With the aid of these pressure-relief ducts 78, compensation is provided for an axial thrust load, by which means the bearing arrangement is substantially simplified.

On the outer periphery of the control element 10, fork-shaped and diametrically opposed control pockets 82 are arranged which are in connection with control openings 37, 40 of the space 14 subjected to high-pressure brine HPB. A flow deflection between the two tubular chambers, connected to the valve unit, of a pressure exchanger takes place on the outer periphery of the control element 10 by means of the control pockets. With the aid of this measure, a displacement of all the control openings and flow openings into only one opening plane 79 is possible at the low-pressure brine LPB end.

The configuration of the control pockets 82 in fork shape has the advantage that a protrusion element 96 remains between the fork-shaped flow paths formed by this configuration. This is, in an advantageous manner, arranged in the plane of the stiffening rib 83, via which the force transfer and the surface pressures between the rotating control element and housing are optimized. If the control pockets 82 have a stepped configuration, the arrangement of the protrusion element 96 is dispensed with. Although this increases the space available for a deflection, it leads to somewhat unfavorable flow ratios during the switch-over motion of the control element 10.

A representation of a type of kinematic reversal of the control pockets has been omitted. In an analogous configuration of the control pockets rotating with the control element 10, it is possible to arrange these control pockets in the housing and then in the form of stationary flow pockets. A flow deflection of the brine into the opening plane 79 would then take place in the housing wall and in the stationary flow pockets.

The openings 70, 71 arranged distributed on the periphery can be recognized on the control element 10 in the region of the space 14 subject to high-pressure brine HPB. By this means, a high-pressure brine HPB flows, after the through-flow, through the flow deflector—not shown here—in the cap part, from radial or semi-axial direction from the outside to the inside in the space 14 of the control element.

Figure 12:
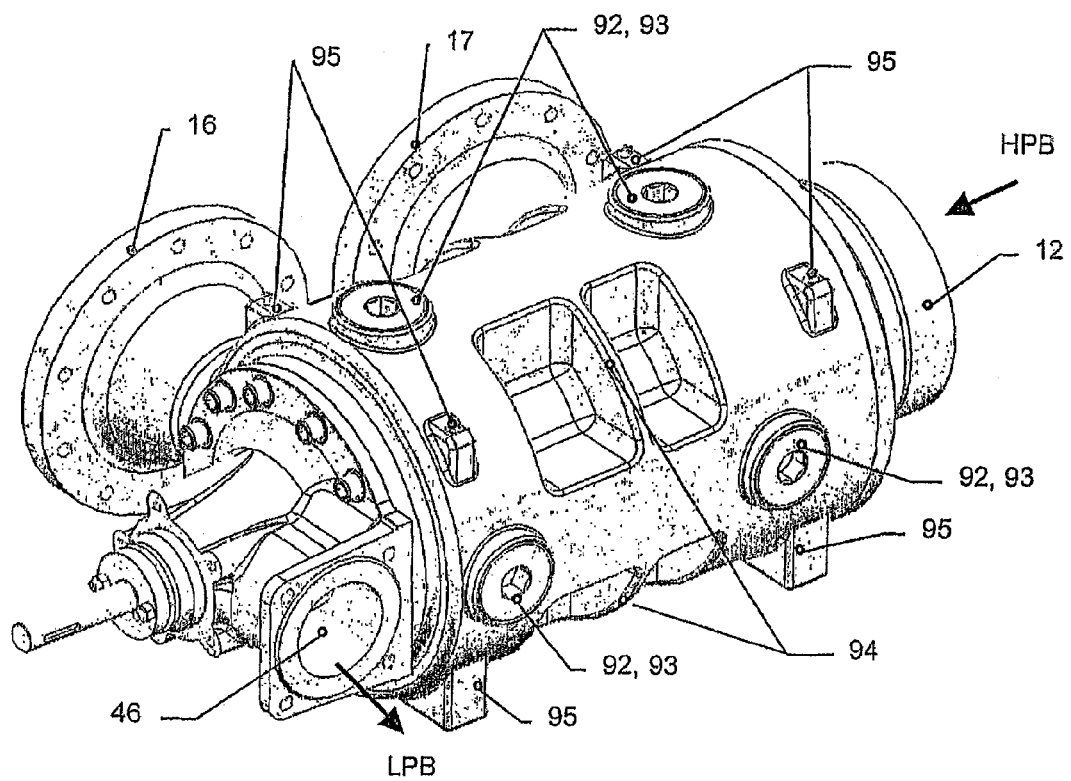
FIG. 12 is a perspective external view of the shorter valve unit of FIGS. 10a and 10b.

FIG. 12 shows a perspective view onto a valve unit as shown in FIG. 10-11. Recognizable in the housing outer wall 15 are the access openings 92, which are arranged in the direction of the axial extension plane of the transfer flow ducts located within the housing. In the illustrative embodiment, simple closure plugs are used as the closing element 93, other constructions, however, being also possible. Additional external reinforcement elements 94 are arranged in the housing 11 between the transfer ducts 18-21 located within the housing wall 15.

Additional material accumulations 95, which have the function of support elements and/or suspension elements for the value unit, are arranged on the outer wall 15 of the housing 11. They facilitate an installation of the valve unit and simplify its handling. In this illustrative embodiment, the connection 46 acting as a drain for the low-pressure brine is a constituent part of a separate cap part. By this means, the outlet flow direction of the low-pressure brine LPB through the connection 46 can be adapted simply to different local features in the simplest manner and by a correspondingly rotated arrangement of this cap part.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A valve unit for switching fluid paths in a pressure exchanger installation having at least two pressure exchangers through which flow occurs alternately, wherein said valve unit comprises a rotatable control element arranged within a housing and a plurality of flow paths inside walls of said housing, said housing having a plurality of connections for connection lines and being connected via respective ones of said connections to a first pipe system and to a respective end of at least one pressure exchanger; another end of each pressure exchanger being connected through an intermediate valve to a second pipe system; said control element being divided into a high pressure chamber and a low pressure chamber and provided with a motor-driven drive shaft for rotating the control element, and the high pressure chamber and low pressure chamber of said control element being alternately connected to the flow paths inside the housing walls and the connections arranged on the housing such that by switching the position of the control element the high pressure chamber is alternately connected to one or the other of the at least two pressure exchangers while the low pressure chamber is alternately connected to the other or the one of the at least two pressure exchangers so that incoming high-pressure fluid flows from the high pressure chamber to one of the pressure exchangers while low-pressure fluid flowing out of the other of the pressure exchangers is conducted through the low pressure chamber to the connection for outgoing low-pressure fluid or vice versa; wherein said control unit connections include a connection for incoming high-pressure fluid leading to the high-pressure chamber of the control element, a connection for outgoing low-pressure fluid leading from the low-pressure chamber and connections for the at least two pressure exchangers which by rotation of the control element are each alternately connected to the high-pressure chamber and low-pressure chamber; wherein a supply flow takes place from the connection for incoming high-pressure fluid in an axial or radial direction to the high pressure chamber of the control element within the housing and a discharge flow of the low-pressure fluid takes place in the axial direction from the low pressure chamber of the control element to the connection for the outgoing low-pressure fluid; wherein control openings arranged in the control element in communication with the high-pressure chamber have an opening angle which differs from the corresponding flow openings of the housing in order to charge the pressure exchanger in effective communication with the valve unit with a high pressure from the supply opening during the switching of the control element, and wherein the control element has a hollow cylindrical configuration and is divided into said high-pressure and low-pressure chambers by a separating wall.

2. A valve unit according to claim 1, wherein the drive shaft is connected to the separating wall so that it transmits torque.

3. A valve unit according to claim 2, wherein the separating wall is arranged in the central region of the hollow cylindrical control element.

4. A valve unit according to claim 1, wherein a component which transmits torque is arranged at one end of the hollow cylindrical control element.

5. A valve unit according to claim 1, wherein the separating wall is solidly connected to the control element.

6. A valve unit according to claim 1, wherein the separating wall is solidly connected to the housing.

7. A valve unit according to claim 6, wherein the separating wall is fastened to the housing by struts in the vicinity of a high-pressure supply opening.

8. A valve unit according to claim 1, wherein sealing elements are arranged in a sealing zone between the separating wall and an inner wall surface of the hollow cylindrical control element.

9. A valve unit according to claim 4, wherein at least one of the separating wall and the struts is a constituent part of an exchangeable insert.

10. A valve unit according to claim 1, wherein the control element has a cylindrical configuration with a peripheral surface in which different pressure regions are formed by a plurality of groove-shaped flow paths.

11. A valve unit according to claim 10, wherein the flow paths of equal pressure regions are arranged diametrically opposite one another on the peripheral surface.

12. A valve unit according to claim 10, wherein a section of the groove-shaped flow paths connected with a flow opening forms the control opening of the control element.

13. A valve unit according to claim 10, wherein an annular groove is arranged in the housing or in the peripheral surface of the control element in the vicinity of a radial high-pressure supply opening.

14. A valve unit according to claim 10, wherein a closed annular sealing zone is arranged on the control element between ends of the groove-shaped flow paths of the different pressure regions.

15. A valve unit according to claim 14, wherein sealing elements are arranged on the control element or on the housing in the area of the sealing zone.

16. A valve unit according to claim 1, wherein a plurality of access openings are arranged in the outer wall of the housing.

17. A valve unit according to claim 1, wherein a plurality of outer stiffening elements are arranged in the outer wall of the housing.

18. A valve unit according to claim 1, wherein the control openings are positioned and sized to permit a flow switchover free from pressure surge.

19. A valve unit according to claim 18, wherein the control openings of the hollow cylindrical control element are configured as elongated holes or as polygons.

20. A valve unit according to claim 18, wherein a closing of control openings of a pressure exchanger chamber is simultaneously associated with an opening of previously closed control openings of another pressure exchanger chamber and vice versa.

21. A valve unit according to claim 1, wherein the control element is supported on a plurality of housing surfaces which are formed by end surfaces of the separating walls.

22. A valve unit according to claim 1, wherein a housing inner wall, which is configured as a separate component, is supported on a housing surface which extends in a meander shape and is formed by end surfaces of the separating walls.

23. A valve unit according to claim 1, wherein the control element is arranged with at least one shaft member in a bearing arrangement.

24. A valve unit according to claim 1, wherein the control element is arranged in such a way that it is free from radial and axial forces.

25. A valve unit according to claim 1, wherein a hollow cylindrical control element with a fixed separating wall rests against a thrust bearing.

26. A valve unit according to claim 1, wherein control openings of the hollow cylindrical control element are configured as elongated holes or as polygons.

27. A valve unit for switching fluid paths in a pressure exchanger installation having at least two pressure exchangers through which flow occurs alternately, wherein said valve unit comprises a rotatable control element with a plurality of flow paths arranged within a housing, said housing having a plurality of connections for connection lines and being connected via respective ones of said connections to a first pipe system and to a respective end of at least one pressure exchanger; another end of each pressure exchanger being connected through an intermediate valve to a second pipe system; said control element being divided into a high pressure chamber and a low pressure chamber and provided with a motor-driven drive shaft for rotating the control element, and the flow paths of said control element being alternately connected to connections arranged on the housing such that by switching the position of the control element the high pressure chamber is alternately connected to one or the other of the at least two pressure exchangers while the low pressure chamber is alternately connected to the other or the one of the at least two pressure exchangers so that incoming high-pressure fluid flows from the high pressure chamber to one of the pressure exchangers while low-pressure fluid flowing out of the other of the pressure exchangers is conducted through the low pressure chamber to the connection for outgoing low-pressure fluid or vice versa; wherein said control unit connections include a connection for incoming high-pressure fluid leading to the high-pressure chamber of the control element, a connection for outgoing low-pressure fluid leading from the low-pressure chamber and connections for the at least two pressure exchangers which by rotation of the control element are each alternately connected to the high-pressure chamber and low-pressure chamber; wherein a supply flow takes place from the connection for incoming high-pressure fluid in an axial or radial direction to the high pressure chamber of the control element within the housing and a discharge flow of the low-pressure fluid takes place in the axial direction from the low pressure chamber of the control element to the connection for the outgoing low-pressure fluid; and wherein control openings arranged in the control element in communication with the high-pressure chamber have an opening angle which differs from the corresponding flow openings of the housing in order to charge the pressure exchanger in effective communication with the valve unit with a high pressure from the supply opening during the switching of the control element, wherein the control element has a hollow cylindrical configuration and is divided into said high-pressure and low-pressure chambers by a separating wall, and said valve unit further comprising stiffening elements arranged in the different pressure chambers.

28. A valve unit according to claim 27, wherein the stiffening elements comprise radially extending ribs or annular elements.

29. A valve unit for switching fluid paths in a pressure exchanger installation having at least two pressure exchangers through which flow occurs alternately, wherein said valve unit comprises a rotatable control element with a plurality of flow paths arranged within a housing, said housing having a plurality of connections for connection lines and being connected via respective ones of said connections to a first pipe system and to a respective end of at least one pressure exchanger; another end of each pressure exchanger being connected through an intermediate valve to a second pipe system; said control element being divided into a high pressure chamber and a low pressure chamber and provided with a motor-driven drive shaft for rotating the control element, and the flow paths of said control element being alternately connected to connections arranged on the housing such that by switching the position of the control element the high pressure chamber is alternately connected to one or the other of the at least two pressure exchangers while the low pressure chamber is alternately connected to the other or the one of the at least two pressure exchangers so that incoming high-pressure fluid flows from the high pressure chamber to one of the pressure exchangers while low-pressure fluid flowing out of the other of the pressure exchangers is conducted through the low pressure chamber to the connection for outgoing low-pressure fluid or vice versa; wherein said control unit connections include a connection for incoming high-pressure fluid leading to the high-pressure chamber of the control element, a connection for outgoing low-pressure fluid leading from the low-pressure chamber and connections for the at least two pressure exchangers which by rotation of the control element are each alternately connected to the high-pressure chamber and low-pressure chamber; wherein a supply flow takes place from the connection for incoming high-pressure fluid in an axial or radial direction to the high pressure chamber of the control element within the housing and a discharge flow of the low-pressure fluid takes place in the axial direction from the low pressure chamber of the control element to the connection for the outgoing low-pressure fluid; and wherein control openings arranged in the control element in communication with the high-pressure chamber have an opening angle which differs from the corresponding flow openings of the housing in order to charge the pressure exchanger in effective communication with the valve unit with a high pressure from the supply opening during the switching of the control element, wherein control pockets having forked or stepped configurations are arranged on the outer circumference of the control element and connected to control openings.

30. A valve unit according to claim 29, wherein the control element comprises a stiffening element in the form of a radially extending rib arranged in one of the pressure chambers, and wherein projecting elements of the fork-shaped control pockets are arranged in the plane of the radial rib.

31. A valve unit according to claim 29, wherein control pockets having forked or stepped configurations are arranged on the inner periphery of the housing inner wall and are connected to flow openings.

32. A valve unit according to claim 29, wherein a plurality of flow-transfer ducts, which connect the flow openings, are arranged on or in the outer wall of the housing.

33. A valve unit according to claim 29, wherein the flow openings are a constituent part of an adjustable, hollow cylindrical housing inner wall.

34. A valve unit according to claim 32, wherein chambers of the pressure exchanger are briefly connected to one another by the flow-transfer ducts when the control element is moved.

35. A valve unit according to claim 32, wherein the flow-transfer ducts are configured as external tubular elements.

36. A valve unit according to claim 35, wherein connections for the tubular elements are arranged so that they are distributed over the outer periphery of the housing.

37. A valve unit according to claim 32, wherein the flow-transfer ducts are configured as flow ducts which are integrated into the housing wall.

38. A valve unit according to claim 32, wherein a fluid exchange between the control element and the flow-transfer ducts takes place via respective mutually diametrically opposed flow openings and control openings corresponding to said opposed flow openings.

39. A valve unit for switching fluid paths in a pressure exchanger installation having at least two pressure exchangers through which flow occurs alternately, wherein said valve unit comprises a rotatable control element with a plurality of flow paths arranged within a housing, said housing having a plurality of connections for connection lines and being connected via respective ones of said connections to a first pipe system and to a respective end of at least one pressure exchanger; another end of each pressure exchanger being connected through an intermediate valve to a second pipe system; said control element being divided into a high pressure chamber and a low pressure chamber and provided with a motor-driven drive shaft for rotating the control element, and the flow paths of said control element being alternately connected to connections arranged on the housing such that by switching the position of the control element the high pressure chamber is alternately connected to one or the other of the at least two pressure exchangers while the low pressure chamber is alternately connected to the other or the one of the at least two pressure exchangers so that incoming high-pressure fluid flows from the high pressure chamber to one of the pressure exchangers while low-pressure fluid flowing out of the other of the pressure exchangers is conducted through the low pressure chamber to the connection for outgoing low-pressure fluid or vice versa; wherein said control unit connections include a connection for incoming high-pressure fluid leading to the high-pressure chamber of the control element, a connection for outgoing low-pressure fluid leading from the low-pressure chamber and connections for the at least two pressure exchangers which by rotation of the control element are each alternately connected to the high-pressure chamber and low-pressure chamber; wherein a supply flow takes place from the connection for incoming high-pressure fluid in an axial or radial direction to the high pressure chamber of the control element within the housing and a discharge flow of the low-pressure fluid takes place in the axial direction from the low pressure chamber of the control element to the connection for the outgoing low-pressure fluid; and wherein control openings arranged in the control element in communication with the high-pressure chamber have an opening angle which differs from the corresponding flow openings of the housing in order to charge the pressure exchanger in effective communication with the valve unit with a high pressure from the supply opening during the switching of the control element, wherein a plurality of pressure-relief ducts are arranged on the outer wall surface of the control element or on an opposite housing surface, or in a housing inner wall.

40. A valve unit according to claim 39, wherein at least one pressure-relief duct is arranged in the control element.

41. A valve unit according to claim 40, wherein a continuous flow occurs through said at least one pressure-relief duct.

42. A valve unit according to claim 40, wherein an alternating flow occurs through said at least one pressure relief duct.

43. A valve unit for switching fluid paths in a pressure exchanger installation having at least two pressure exchangers through which flow occurs alternately, wherein said valve unit comprises a rotatable control element with a plurality of flow paths arranged within a housing, said housing having a plurality of connections for connection lines and being connected via respective ones of said connections to a first pipe system and to a respective end of at least one pressure exchanger; another end of each pressure exchanger being connected through an intermediate valve to a second pipe system; said control element being divided into a high pressure chamber and a low pressure chamber and provided with a motor-driven drive shaft for rotating the control element, and the flow paths of said control element being alternately connected to connections arranged on the housing such that by switching the position of the control element the high pressure chamber is alternately connected to one or the other of the at least two pressure exchangers while the low pressure chamber is alternately connected to the other or the one of the at least two pressure exchangers so that incoming high-pressure fluid flows from the high pressure chamber to one of the pressure exchangers while low-pressure fluid flowing out of the other of the pressure exchangers is conducted through the low pressure chamber to the connection for outgoing low-pressure fluid or vice versa; wherein said control unit connections include a connection for incoming high-pressure fluid leading to the high-pressure chamber of the control element, a connection for outgoing low-pressure fluid leading from the low-pressure chamber and connections for the at least two pressure exchangers which by rotation of the control element are each alternately connected to the high-pressure chamber and low-pressure chamber; wherein a supply flow takes place from the connection for incoming high-pressure fluid in an axial or radial direction to the high pressure chamber of the control element within the housing and a discharge flow of the low-pressure fluid takes place in the axial direction from the low pressure chamber of the control element to the connection for the outgoing low-pressure fluid; and wherein control openings arranged in the control element in communication with the high-pressure chamber have an opening angle which differs from the corresponding flow openings of the housing in order to charge the pressure exchanger in effective communication with the valve unit with a high pressure from the supply opening during the switching of the control element, wherein the control element has a hollow cylindrical configuration and is divided into said high-pressure and low-pressure chambers by a separating wall, and wherein the control element is supported on a housing surface which extends in a meander shape and is formed by the end surfaces of the separating wall.

44. A valve unit for switching fluid paths in a pressure exchanger installation having at least two pressure exchangers through which flow occurs alternately, wherein said valve unit comprises a rotatable control element with a plurality of flow paths arranged within a housing, said housing having a plurality of connections for connection lines and being connected via respective ones of said connections to a first pipe system and to a respective end of at least one pressure exchanger; another end of each pressure exchanger being connected through an intermediate valve to a second pipe system; said control element being divided into a high pressure chamber and a low pressure chamber and provided with a motor-driven drive shaft for rotating the control element, and the flow paths of said control element being alternately connected to connections arranged on the housing such that by switching the position of the control element the high pressure chamber is alternately connected to one or the other of the at least two pressure exchangers while the low pressure chamber is alternately connected to the other or the one of the at least two pressure exchangers so that incoming high-pressure fluid flows from the high pressure chamber to one of the pressure exchangers while low-pressure fluid flowing out of the other of the pressure exchangers is conducted through the low pressure chamber to the connection for outgoing low-pressure fluid or vice versa; wherein said control unit connections include a connection for incoming high-pressure fluid leading to the high-pressure chamber of the control element, a connection for outgoing low-pressure fluid leading from the low-pressure chamber and connections for the at least two pressure exchangers which by rotation of the control element are each alternately connected to the high-pressure chamber and low-pressure chamber; wherein a supply flow takes place from the connection for incoming high-pressure fluid in an axial or radial direction to the high pressure chamber of the control element within the housing and a discharge flow of the low-pressure fluid takes place in the axial direction from the low pressure chamber of the control element to the connection for the outgoing low-pressure fluid; and wherein control openings arranged in the control element in communication with the high-pressure chamber have an opening angle which differs from the corresponding flow openings of the housing in order to charge the pressure exchanger in effective communication with the valve unit with a high pressure from the supply opening during the switching of the control element, wherein the high-pressure side of the control element is formed between two fixed separating walls.

45. A valve unit according to claim 44, wherein the high-pressure side of the control element is connected to an annular space arranged in the housing.

46. A valve unit for switching fluid paths in a pressure exchanger installation having at least two pressure exchangers through which flow occurs alternately, wherein said valve unit comprises a rotatable control element with a plurality of flow paths arranged within a housing, said housing having a plurality of connections for connection lines and being connected via respective ones of said connections to a first pipe system and to a respective end of at least one pressure exchanger; another end of each pressure exchanger being connected through an intermediate valve to a second pipe system; said control element being divided into a high pressure chamber and a low pressure chamber and provided with a motor-driven drive shaft for rotating the control element, and the flow paths of said control element being alternately connected to connections arranged on the housing such that by switching the position of the control element the high pressure chamber is alternately connected to one or the other of the at least two pressure exchangers while the low pressure chamber is alternately connected to the other or the one of the at least two pressure exchangers so that incoming high-pressure fluid flows from the high pressure chamber to one of the pressure exchangers while low-pressure fluid flowing out of the other of the pressure exchangers is conducted through the low pressure chamber to the connection for outgoing low-pressure fluid or vice versa; wherein said control unit connections include a connection for incoming high-pressure fluid leading to the high-pressure chamber of the control element, a connection for outgoing low-pressure fluid leading from the low-pressure chamber and connections for the at least two pressure exchangers which by rotation of the control element are each alternately connected to the high-pressure chamber and low-pressure chamber; wherein a supply flow takes place from the connection for incoming high-pressure fluid in an axial or radial direction to the high pressure chamber of the control element within the housing and a discharge flow of the low-pressure fluid takes place in the axial direction from the low pressure chamber of the control element to the connection for the outgoing low-pressure fluid; and wherein control openings arranged in the control element in communication with the high-pressure chamber have an opening angle which differs from the corresponding flow openings of the housing in order to charge the pressure exchanger in effective communication with the valve unit with a high pressure from the supply opening during the switching of the control element, wherein the housing is provided with a connection for connection to each pressure exchanger, a connection for a high-pressure supply opening and with a connection for an axially or radially arranged low-pressure outlet opening.

47. A valve unit according to claim 46, wherein the supply opening is arranged downstream of a flow deflector provided with support elements, and the flow deflector surrounds a bearing arrangement for the control element.

48. A valve unit according to claim 47, wherein the supply opening with the flow deflector and the bearing arrangement are arranged in a cap part connected to the housing.

* * * * *

UNITED STATES PATENT AND TRADEMARK OFFICE
CERTIFICATE OF CORRECTION

| | |
|---|---|
| PATENT NO. | : 7,600,535 B2 |
| APPLICATION NO. | : 11/222866 |
| DATED | : October 13, 2009 |
| INVENTOR(S) | : Baumgarten et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this

Fifth Day of October, 2010

David J. Kappos
*Director of the United States Patent and Trademark Office*